(No Model.)
L. H. CLARK.
PISTON ROD PACKING.
No. 557,107.  Patented Mar. 31, 1896.
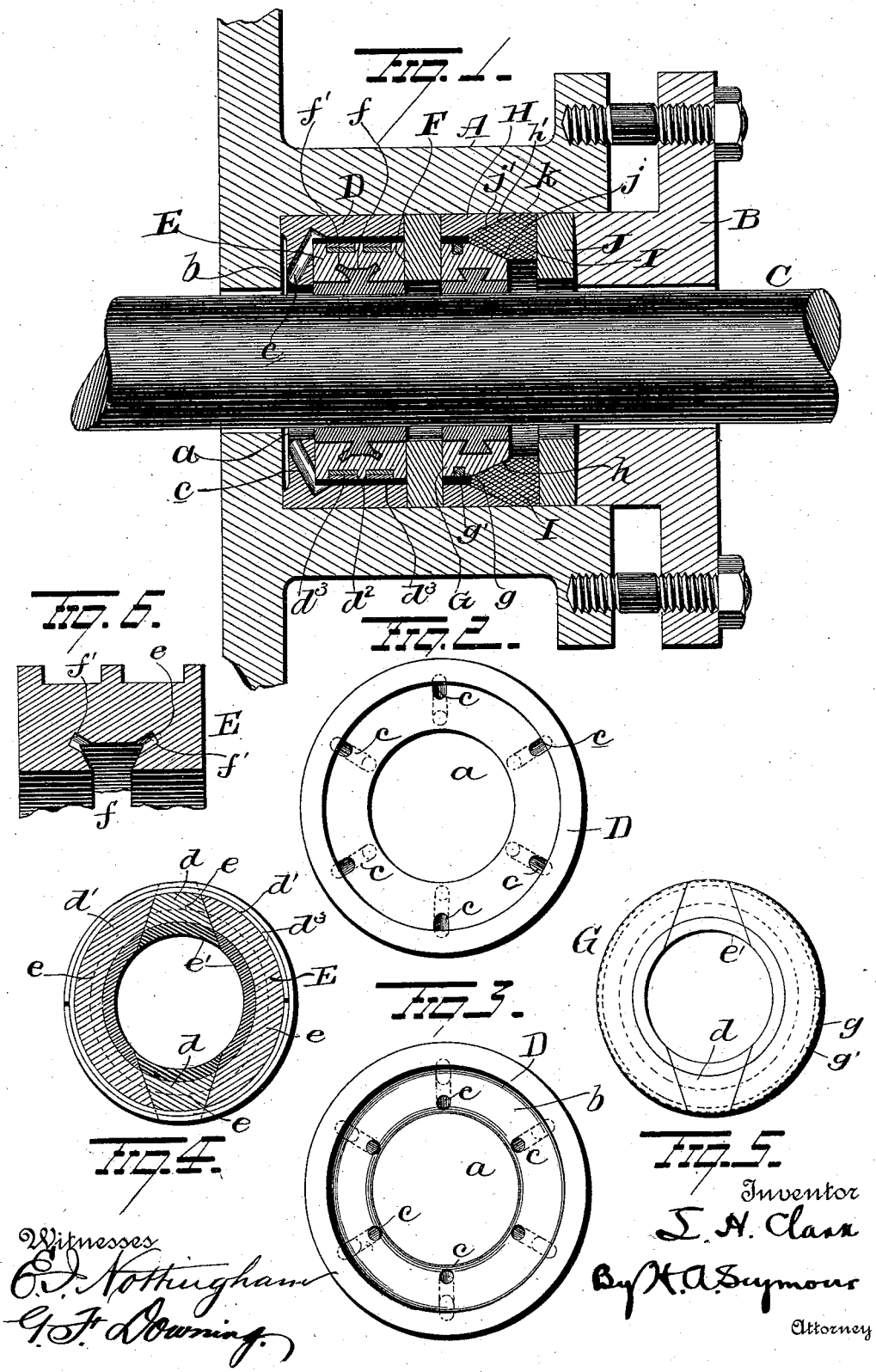

UNITED STATES PATENT OFFICE.

LOUIE HENRY CLARK, OF FOND DU LAC, WISCONSIN, ASSIGNOR TO THE AMERICAN METALLIC PACKING COMPANY, OF NEW YORK, N. Y.

PISTON-ROD PACKING.

SPECIFICATION forming part of Letters Patent No. 557,107, dated March 31, 1896.

Application filed September 28, 1894. Renewed September 5, 1895. Serial No. 561,590. (No model.)

*To all whom it may concern:*

Be it known that I, LOUIE HENRY CLARK, a resident of Fond du Lac, in the county of Fond du Lac and State of Wisconsin, have invented certain new and useful Improvements in Piston-Rod Packings; and I do hereby declare the following to be a full, clear, and exact description of the invention, such as will enable others skilled in the art to which it appertains to make and use the same.

My invention relates to an improvement in piston-rod packing, the object of the invention being to so construct such a packing that it shall be simple in construction, durable and efficient.

With this object in view the invention consists in certain novel features of construction and combinations and arrangements of parts, as hereinafter set forth, and pointed out in the claims.

In the accompanying drawings, Figure 1 is a sectional view illustrating my improvements. Figs. 2, 3, 4, 5, and 6 are detail views.

A represents a stuffing-box, and B the gland, through which the piston-rod C passes, the bore of the opening in the stuffing-box through which the rod passes being of a diameter sufficiently larger than the diameter of the piston-rod to permit the passage of steam into the inner end of the stuffing-box. Within the stuffing-box a cage D is located and is made with an opening $a$ for the passage of the piston-rod, said opening being sufficiently larger than the diameter of the piston-rod to permit a slight lateral movement of the latter. The back of the cage is preferably made with a recess $b$, and the back or bottom of said cage is also made with a series of ports $c$ for the passage of steam, said ports extending from the inner edge of the flange which composes the bottom or back of the cage to points within the cage at the junction of said flange or back with the annular body of the cage. A packing-ring E is located on the piston-rod, said packing-ring being placed within the cage D and having a bearing at one end against the back or bottom of the cage.

A ring F bears against the open end of the cage D and the packing-ring E, said ring F having a bore sufficiently greater than the diameter of the piston to permit lateral motion of the latter. The packing-ring E is preferably composed of four sections $d\ d\ d'\ d'$, the sections $d\ d$ having their ends beveled outwardly and the intermediate sections $d'$ having their ends beveled inwardly. The packing-ring thus formed is provided with preferably two grooves $d^2$, in each of which flat springs $d^3$ are placed whereby to insure a constant tight fit of the ring to the piston-rod. The packing-ring is composed of brass or other suitable metal $e$ and a lining $e'$ of bearing-metal. In uniting the two metals the brass portion is made internally with a groove $f$, in the back of which laterally-extending sockets $f'$ are made. The groove is made dovetailed, and said groove and sockets are then tinned to cause the bearing-metal $e'$ to properly adhere thereto. By thus constructing the ring E a better end bearing will be provided therefor than if the ring were made wholly of soft metal, and the ring therefore is more durable. A sectional packing-ring G made of hard and soft metal, as above explained in connection with packing-ring E, is located on the piston-rod and adapted to bear against the ring F.

The packing-ring G is made in its periphery with a groove $g$ for the reception of a spring $g'$, and said packing-ring G is also made with an outer beveled face $h$. A split ring H, preferably of soft metal, is located within the stuffing-box parallel with the packing-ring G and made with an inner beveled face $h'$, said rings G H being of such size relatively to each other as to leave a space between them and the ring H being adapted to bear against the inner wall of the stuffing-box. The ring H, as well as the ring G, has a steam-tight bearing against the ring F.

A ring I of elastic material is located between the rings G and H, and is made with two beveled faces $j\ j'$, which bear against the beveled faces of the respective rings G H, said ring I also having a bearing at $k$ against the inner wall or face of the stuffing-box. In other words, the ring I is practically V-shaped in cross-section, having a portion of its periphery (at $k$) parallel with the wall of the stuffing-box. Against the elastic ring I a ring J bears, the inner diameter of said ring J being sufficiently greater than the diameter of the piston-rod to permit the lateral motion of the latter. Against the ring J the gland B bears, the pressure exerted by said gland when it is secured in place serving to force the elastic ring I between the rings G H, the effect of which is to force the ring G tightly against the piston-rod and the ring H tightly against the inner wall of the stuffing-box, thus preventing the passage of steam past these rings. The pressure of the ring I on the rings G H also forces the latter tight against the ring F, so as to render the connection between said rings G, H, and F steam-tight, and the ring F is in turn forced tightly against the end of the cage D and the long packing-ring E. The pressure of the elastic packing-ring I against the rings G H also produces a steam-tight joint between these two rings.

By the construction and arrangement of packing-rings above described steam which enters the stuffing-box to act upon the long packing-ring E cannot get outside of the cage D. The cage D will be held firmly against the back of the stuffing-box, so that steam or water will not pass outside of said cage; but should any steam or water get past it on the outside it will be prevented from coming out of the stuffing-box by the ring H.

It will be observed that considerable play is left between the packing-ring E and the inside of the cage D, and also between the rings G and H. This allows for all expansion and contraction of the metal in these various parts and will admit of any vibration that the rod may have, so that this packing will pack rods that are out of line as well as others. The elastic ring I does not touch the piston-rod, and it acts as a sort of cushion to take all the jar, and at the same time it will yield enough in all directions to admit of the narrow packing-ring vibrating with the piston-rod. When the end of the gland is cut square, the ring J may be omitted.

My improvements are simple in construction and effectual in all respects in the performance of their functions.

Slight changes might be made in the details of construction of my invention without departing from the spirit thereof or limiting its scope, and hence I do not wish to limit myself to the exact details of construction herein set forth; but, Having fully described my invention, what I claim as new, and desire to secure by Letters Patent, is—

1. In a piston-rod packing, the combination with a stuffing-box and a piston-rod, of parallel rings, one bearing against the piston-rod and the other against the stuffing-box, an elastic ring between said parallel rings, and rings bearing against the elastic ring and parallel rings respectively and having an internal diameter sufficiently greater than the piston-rod to permit vibration of the latter, substantially as set forth.

2. In a piston-rod packing, the combination with a piston-rod and a stuffing-box, of parallel rings out of contact with each other, one bearing against the stuffing-box and the other against the piston-rod, said parallel rings having inner beveled or inclined faces, and an elastic ring disposed between said parallel rings and having beveled or inclined faces to bear against the beveled or inclined faces of the parallel rings and force the latter against the inner wall of the stuffing-box and the piston-rod respectively, substantially as set forth.

3. In a piston-rod packing, the combination with a stuffing-box, gland and piston-rod passing through the box and gland, of a cage fitted in the stuffing-box, a sectional packing-ring within said cage, a ring bearing on the end of said cage and packing-ring, parallel bearing-rings bearing on said last-mentioned ring and an elastic ring interposed between said parallel rings and adapted to force them respectively against the piston-rod and wall of the stuffing-box, substantially as set forth.

4. In a piston-rod packing, the combination with a stuffing-box and a piston-rod, of a cage located in said stuffing-box, a sectional packing-ring within said cage, a ring bearing on the end of said cage and packing-ring, parallel bearing-rings bearing on said last-mentioned ring, an elastic ring between said parallel rings and adapted to force them, respectively, against the piston-rod and wall of the stuffing-box, a gland and a ring disposed between said gland and the elastic ring, substantially as set forth.

In testimony whereof I have signed this specification in the presence of two subscribing witnesses.

LOUIE HENRY CLARK.

Witnesses:
N. C. GIFFIN,
L. A. FERRIS.